US011327239B2

(12) United States Patent
Geens et al.

(10) Patent No.: US 11,327,239 B2
(45) Date of Patent: May 10, 2022

(54) CABLE MANAGEMENT ARRANGEMENT

(71) Applicant: COMMSCOPE CONNECTIVITY BELGIUM BVBA, Kessel-Lo (BE)

(72) Inventors: Johan Geens, Bunsbeek (BE); Pieter Vermeulen, Westerlo (BE); Bart Vos, Geel (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/983,377

(22) Filed: Aug. 3, 2020

(65) Prior Publication Data
US 2020/0363591 A1 Nov. 19, 2020

Related U.S. Application Data

(63) Continuation of application No. 16/069,831, filed as application No. PCT/EP2017/050530 on Jan. 12, 2017, now Pat. No. 10,732,356.
(Continued)

(51) Int. Cl.
*G02B 6/36* (2006.01)
*G02B 6/44* (2006.01)
*H04B 10/25* (2013.01)

(52) U.S. Cl.
CPC ........... *G02B 6/3608* (2013.01); *G02B 6/444* (2013.01); *G02B 6/4453* (2013.01); *G02B 6/4454* (2013.01); *H04B 10/25* (2013.01)

(58) Field of Classification Search
None
See application file for complete search history.

(56) References Cited

U.S. PATENT DOCUMENTS 4,154,977 A 5/1979 Verma
4,625,074 A 11/1986 Cox
(Continued)

FOREIGN PATENT DOCUMENTS

CN 102474085 5/2012
EP 0863035 A1 * 9/1998 .............. B60J 10/70
(Continued)

OTHER PUBLICATIONS

International Search Report and Written Opinion of the International Searching Authority for International Patent Application No. PCT/EP2017/050530 dated Mar. 31, 2017, 17 pages.

*Primary Examiner* — Rhonda S Peace
(74) *Attorney, Agent, or Firm* — Merchant & Gould P.C.

(57) ABSTRACT

A cable management arrangement (1000) is disclosed. In one aspect, a plurality of cables (1002) extending between first and second ends is provided. The arrangement (1000) can also include a supporting sheet (1004) having a first side and a second side, wherein the plurality of cables (1002) is removably adhered to the supporting sheet first side by a first adhesive (1010). A second adhesive (1012) can be provided on at least a portion of the supporting sheet second side and a protection sheet (1014) can be provided to cover the second adhesive (1012). A protection sheet (1014) can be provided that is removable from the supporting sheet (1004) to allow the supporting sheet (1004) to be adhered to a surface. A telecommunications arrangement is also disclosed in which the aforementioned cable management arrangement (1000) is mounted to a telecommunications tray (112) via the second adhesive (1012).

18 Claims, 16 Drawing Sheets

Related U.S. Application Data

(60) Provisional application No. 62/277,774, filed on Jan. 12, 2016, provisional application No. 62/286,101, filed on Jan. 22, 2016.

(56) References Cited

U.S. PATENT DOCUMENTS

| | | | |
|---|---|---|---|
| 4,753,509 A * | 6/1988 | Parstorfer | G02B 6/4471 385/135 |
| 5,204,925 A | 4/1993 | Bonanni | |
| 5,327,513 A | 7/1994 | Nguyen | |
| 5,422,439 A | 6/1995 | Grove | |
| 5,754,724 A | 5/1998 | Peterson et al. | |
| 5,902,435 A | 5/1999 | Meis | |
| 6,427,034 B1 | 7/2002 | Meis | |
| 6,442,323 B1 | 8/2002 | Sorosiak | |
| 6,445,866 B1 | 9/2002 | Clairadin | |
| 6,554,483 B1 | 4/2003 | Sun | |
| 6,668,129 B2 | 12/2003 | Kondo | |
| 6,684,020 B2 * | 1/2004 | Wojcik | G02B 6/4453 385/135 |
| 6,697,560 B1 | 2/2004 | Kondo | |
| 6,721,042 B1 * | 4/2004 | Sun | G02B 6/3608 355/114 |
| 6,985,667 B2 | 1/2006 | Arishima | |
| 7,215,865 B2 | 5/2007 | Bellekens | |
| 8,687,934 B2 | 4/2014 | Wright et al. | |
| 9,223,094 B2 | 12/2015 | Schneider | |
| 9,494,763 B2 | 11/2016 | Benner | |
| 9,946,045 B2 | 4/2018 | Kegerise | |
| 10,379,311 B1 | 8/2019 | Krywicki | |
| 2002/0015563 A1 | 2/2002 | Murakami | |
| 2002/0131719 A1 | 9/2002 | Grois | |
| 2004/0161212 A1 | 8/2004 | Sun | |
| 2005/0095406 A1 * | 5/2005 | Gunzel | B29C 65/5092 428/190 |
| 2009/0147351 A1 | 6/2009 | Oshita | |
| 2011/0026895 A1 | 2/2011 | Baum et al. | |
| 2012/0243845 A1 | 9/2012 | Wright | |
| 2013/0034324 A1 | 2/2013 | Laing | |
| 2017/0045693 A1 | 2/2017 | Hodge | |
| 2019/0025521 A1 | 1/2019 | Geens | |

FOREIGN PATENT DOCUMENTS

| | | |
|---|---|---|
| GB | 2314940 | 1/1998 |
| JP | 2003-037628 | 2/2003 |
| WO | 2004074894 | 9/2004 |
| WO | 2011017227 | 2/2011 |
| WO | 2014134154 | 9/2014 |
| WO | 2016042018 | 3/2016 |
| WO | 2016042034 | 3/2016 |

* cited by examiner

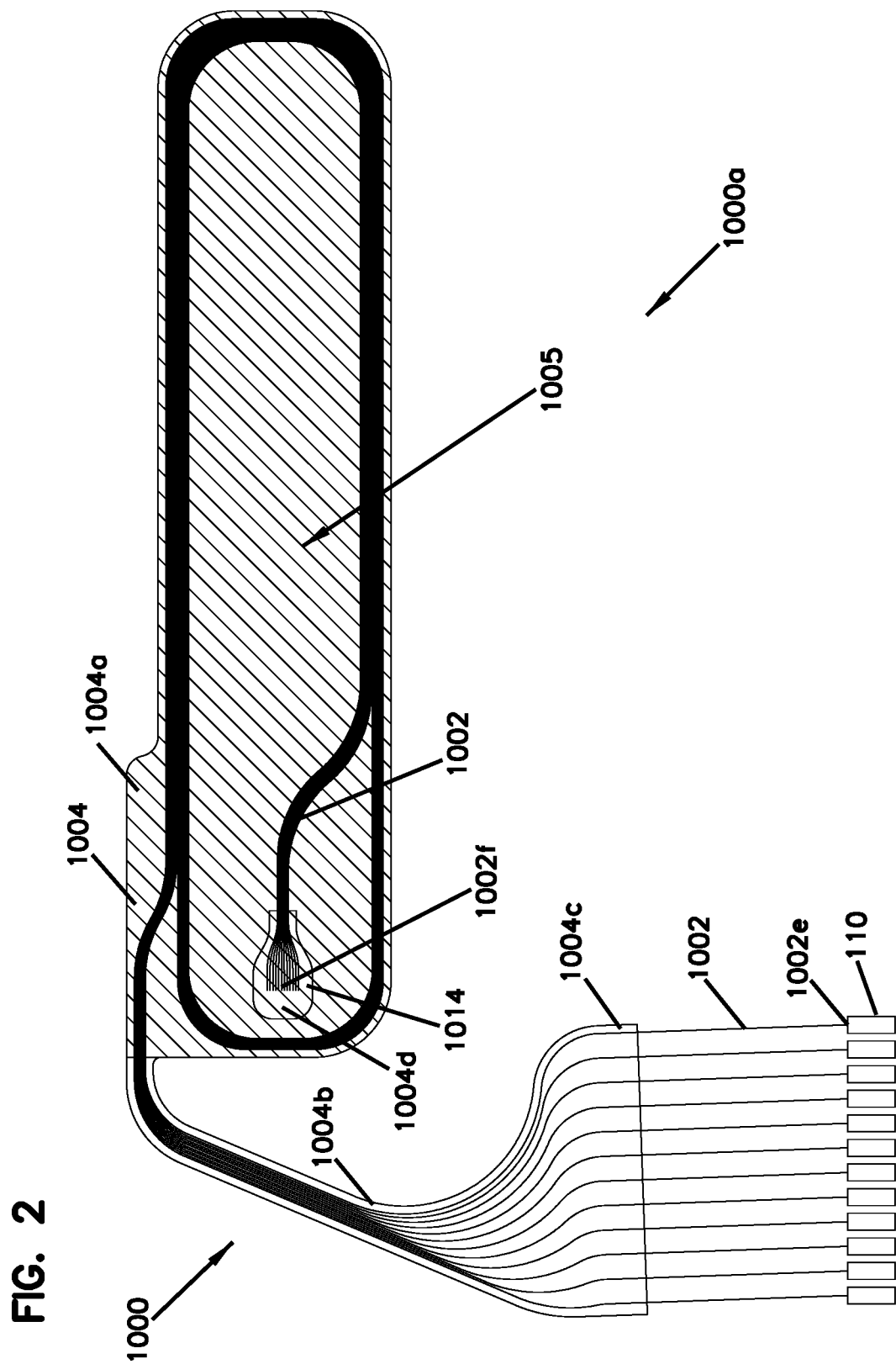

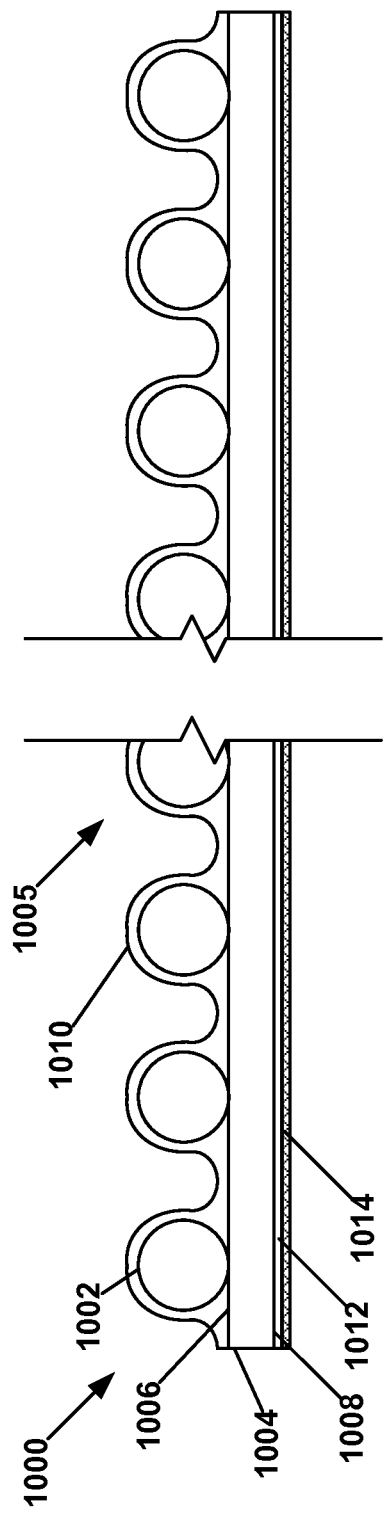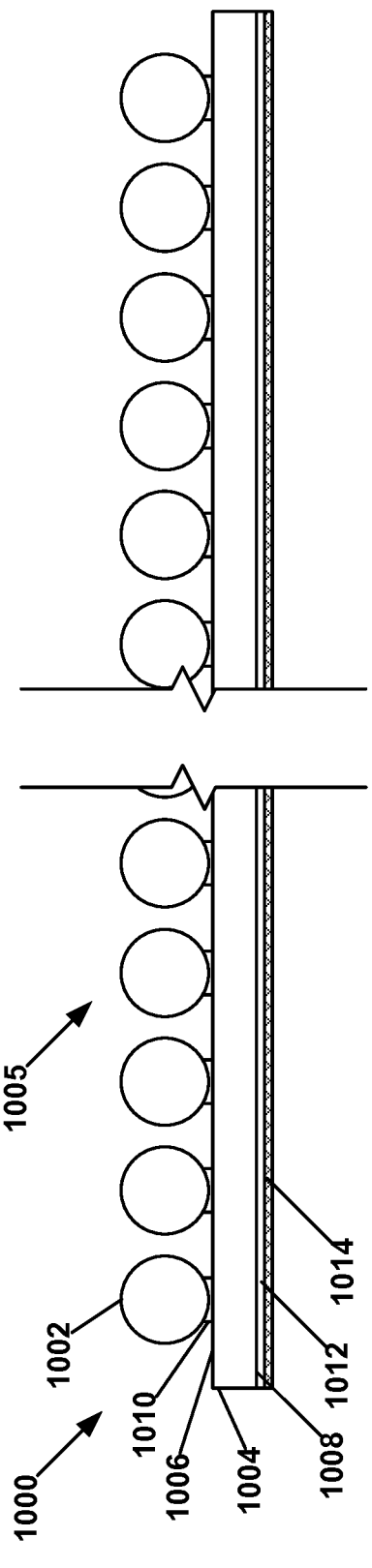

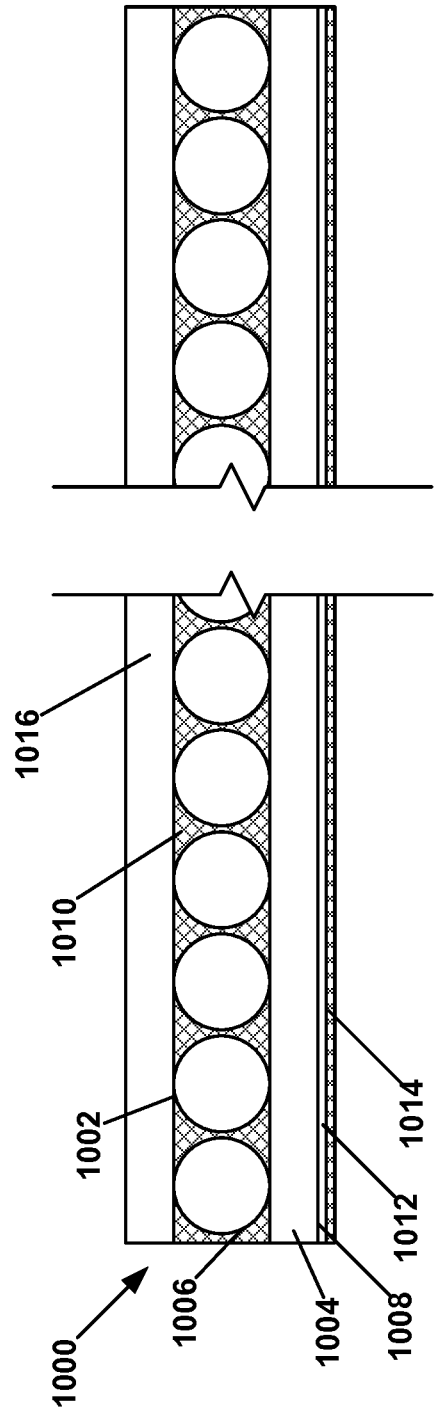
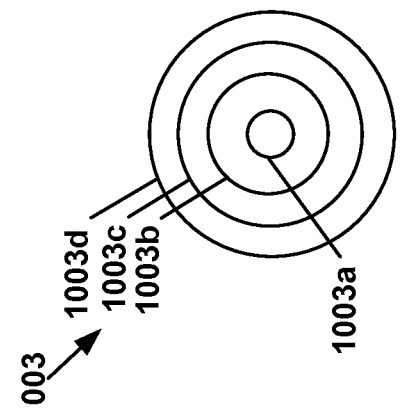
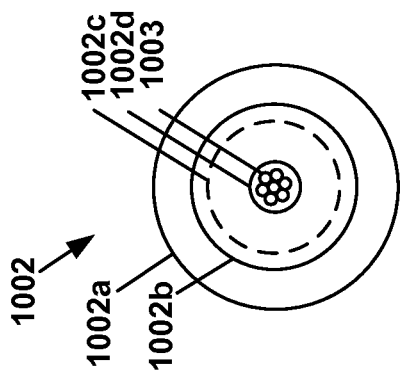

CABLE MANAGEMENT ARRANGEMENT

CROSS-REFERENCE TO RELATED APPLICATIONS

This application is a Continuation of U.S. patent application Ser. No. 16/069,831, filed on Jul. 12, 2018, now U.S. Pat. No. 10,732,356, which is a National Stage Application of PCT/EP2017/050530, filed on Jan. 12, 2017, which claims the benefit of U.S. Patent Application Ser. No. 62/277,774, filed on Jan. 12, 2016, and claims the benefit of U.S. Patent Application Ser. No. 62/286,101, filed on Jan. 22, 2016, the disclosures of which are incorporated herein by reference in their entireties. To the extent appropriate, a claim of priority is made to each of the above disclosed applications.

FIELD OF THE INVENTION

The present invention relates to arrangements adapted to manage and control telecommunications and other types of cables in an effective manner.

BACKGROUND

Numerous telecommunications panels exist today and are used in various equipment applications. Conventional telecommunications panels generally include telecommunications cables that are independent routed between telecommunications components. The identification and separation of individual or specific cables can be problematic for these types of installations.

SUMMARY

Cable management arrangements are disclosed in which one or more cables are removably secured to a carrier or support sheet structure. The cables can be arranged in any desired manner and length on the carrier or support sheet structure. In one aspect, the cables are arranged in a coiled or serpentine manner, and can be peeled away from the carrier or support sheet structure. In this manner, an arrangement can be factory produced in which the cables are securely stored on the carrier or sheet and can then be later selectively peeled from the carrier or sheet in the field during installation. Such an approach also ensures that the cables are arranged so that minimum bend radius limitations are maintained. As a result, quality control can be maintained at a high level during factory production. The resulting construction is also easily transportable while maintaining the desired routing and storage patterns.

The carrier or support sheet can be provided with a specifically designed shape to allow for cable routing within an environment, for example within a fiber optic storage tray. In this manner, entire lengths of individual cables do not need to be routed and managed in the field. Rather, an installer can simply place the carrier or support sheet at the desired location, and subsequently remove the necessary length of cable to provide the final connection between the cables and other devices or cables. In some examples, portions of the cables are permanently secured to the carrier or sheet while other portions of the cables can be peeled from the carrier or sheet. For example, the cables may be permanently attached to a zone or portion of the carrier or sheet responsible for routing the cables from one location to another while the cables may be removable from a portion or zone of the carrier or sheet responsible for storing lengths of cable that are intended to be removed such that they can be routed to a different location. As will be further appreciated in the remaining portions of this application, the disclosed arrangements and methods represent a significant advance over approaches requiring individual installation and routing of cables.

The disclosure includes multiple embodiments of cable management arrangements. In one example, at least one cable, or a plurality of cables extending between first and second ends is, provided. The arrangement can also include a supporting sheet having a first side and a second side, wherein the one cable or the plurality of cables is removably adhered to the supporting sheet first side by a first adhesive. A second adhesive can be provided on at least a portion of the supporting sheet second side and a protection sheet can be provided to cover the second adhesive. A protection sheet can be provided that is removable from the supporting sheet to allow the second adhesive to be exposed such that the supporting sheet can be adhered to a surface.

A telecommunications arrangement is also disclosed in which the aforementioned cable management arrangement is mounted to a telecommunications tray, for example a splice tray, via the second adhesive or by a fastener system (e.g. clamping, bolting, clips, slots that receive the support sheet edges, etc.). Multiples of the telecommunications trays can be mounted within a support tray of a support tray assembly that can in turn be mounted within a telecommunications cabinet.

A method of installing telecommunications cables in a telecommunications assembly is also disclosed. The method can include: providing a telecommunications tray having a plurality of cables adhered to a bottom side of the tray that extend to optical connectors; installing the telecommunications tray within a tray assembly having a plurality of adapters; connecting at least some of the adapters to at least some of the connectors; peeling at least a portion of some of the cables from the bottom side of the telecommunications tray and routing the portion to a top side of the telecommunications tray; and connecting the at least some cables to a telecommunications component or splicing one or more of the cables peeled from the sheet to other cables.

An arrangement and method of installing a telecommunications cable is also disclosed. The method can include: providing a telecommunications device having a cable adhered to the device; peeling at least a portion of the cable from the telecommunications device and routing the portion to a telecommunications component or splicing the cable to another cable.

Aspects of the disclosure are directed to a multi-positionable tray assembly for mounting within a chassis of a telecommunications panel. In one aspect, the multi-positionable tray assembly includes a tray and a support arm. The tray is configured to support at least one cable management structure while the support arm is connected to and supports the tray at a pivot joint. This structure allows the tray to be rotatable about the pivot joint at a pivot axis between a folded position and an access position. In some examples, the cables are fiber optic cables. In some examples, one end of the fiber optic cables is connectorized.

BRIEF DESCRIPTION OF THE DRAWINGS

The accompanying drawings, which are incorporated in and constitute a part of the description, illustrate several aspects of the present disclosure. A brief description of the drawings is as follows:

FIG. 2 is a top view of the cable management arrangement shown in FIG. 1 with a peel off area identified on the cable management arrangement.

FIG. 3 is an example schematic cross-sectional view of the cable management arrangement shown in FIG. 1 or 1A at a peel off area.

FIG. 3A is an example schematic cross-sectional view of the cable management arrangement shown in FIG. 1 or 1A at a peel off area.

FIG. 3B is an example schematic cross-sectional view of the cable management arrangement shown in FIG. 1 or 1A outside of the peel off area.

FIG. 4 is a schematic cross-sectional view of an example cable usable with the cable management arrangement shown in FIG. 1.

FIG. 5 is a schematic cross-sectional view of an optical fiber of the cable shown in FIG. 4.

DETAILED DESCRIPTION

Reference will now be made in detail to exemplary aspects of the present disclosure that are illustrated in the accompanying drawings. Whenever possible, the same reference numbers will be used throughout the drawings to refer to the same or similar parts.

Figure 1:
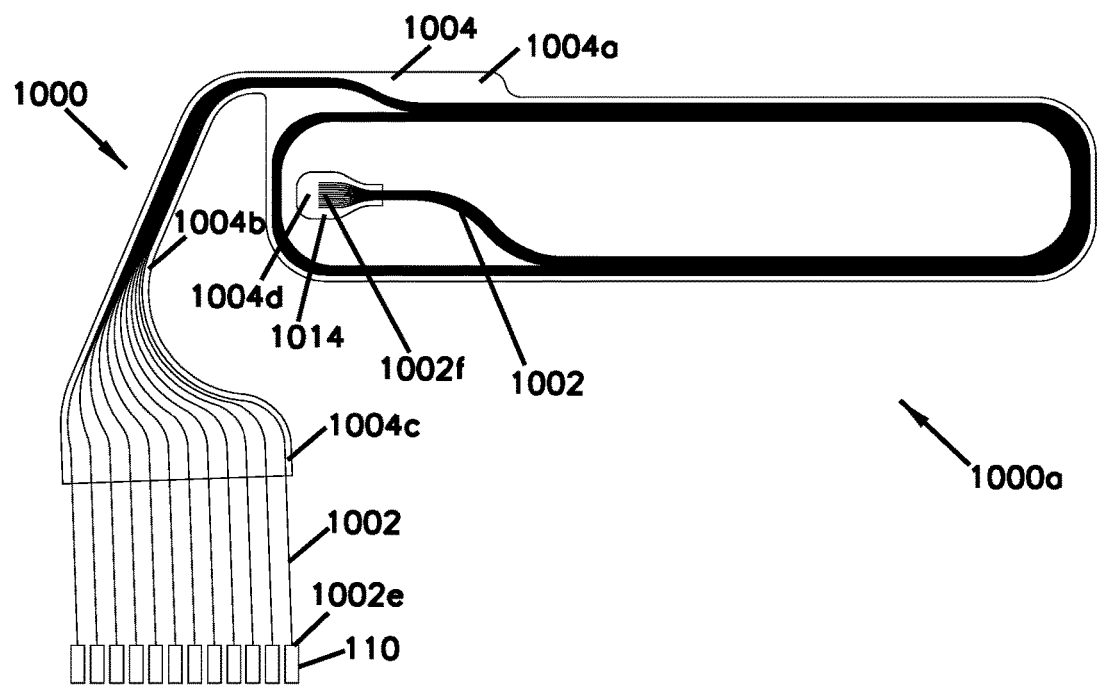
FIG. 1 is a top view of an example cable management arrangement in accordance with principles of the present disclosure.

Referring to FIGS. 1 to 3, an example of a cable management arrangement 1000 is presented. The cable management arrangement 1000 is provided to efficiently manage the routing of cables 1002. The cable management arrangement 1000 is shown as including a plurality of cables 1002 adhered or otherwise mounted to a support sheet 1004. In the example shown, 12 cables 1002 are provided. However, more or fewer cables 1002 may be provided, for example any number of cables between 1 and 48 cables 1002. More than 48 cables 1002 may also be provided. The cables 1002 may be any type of cable, for example, power cables and/or telecommunications cables and data cables having a signal conveying member(s), such as optical fibers, copper wire, metal wire, and twisted pair cables. Different types of cables 1002 may also be adhered to the same support sheet 1004 as well, for example, a power cable and a telecommunications cable. One example of a cable 1002 is shown at FIG. 4. As shown, cable 1002 has a jacket 1002a, a strengthening layer 1002b, an aramid cladding layer 1002c, a buffer tube 1002d, and a plurality of optical fibers 1003. Referring to FIG. 5, an example of an optical fiber 1003 is shown. As shown, optical fiber 1003a has a core 1003a, a cladding layer 1003b, a coating/acrylate later 1003c, and a jacket 1003d. In some examples, the cables 1002 are about 250 micrometers in diameter. Many other types of cables are usable with the concepts disclosed herein.

In the example shown, each of the cables 1002 extends between a first end 1002e and a second end 1002f. The first ends 1002e are shown as being provided with connectors 110 which can be, for example, optical type connectors, such as LC type connectors. In one example, the connectors 110 are mounted directly to the sheet 1004. The second ends 1002f are shown as being free ends that can be connected to telecommunications components, for example the terminals of an optical splice or splitter tray and/or to connectors.

As most easily seen at FIG. 3, the support sheet 1004 has a first side 1006 and an opposite second side 1008. The support sheet 1004 can be formed from a variety of materials, for example, polymeric or plastic materials and paper-based materials. The support sheet 1004 may be made from any material capable of functioning as a carrier for the cables 1002. Additionally, the support sheet 1004 can be flexible, thereby allowing the sheet 1004 to conform to irregular surfaces and/or to allow the sheet, or portions of the sheet, to be easily routed within an installed environment. In one aspect, the cables 1002 are removably affixed to the first side 1006 of the support sheet 1004. In one example, the cables 1002 are affixed to the first side 1006 by an adhesive 1010, for example a sprayed silicone adhesive or shrink-wrapped foil. In the example shown at FIG. 3, the adhesive 1010 is sprayed or otherwise formed onto the cables 1002 and support sheet first side 1006 after the cables have been oriented as desired on the first side 1006 of the support sheet 1004. In the example shown at FIG. 3, the adhesive 1010 completely covers the cables 1002 such that each cable 1002 must break through the top surface of the adhesive 1010 in order to be separated from the support sheet 1004, as is shown for the cable 1002 at the far right of the figure.

Figure 1A:
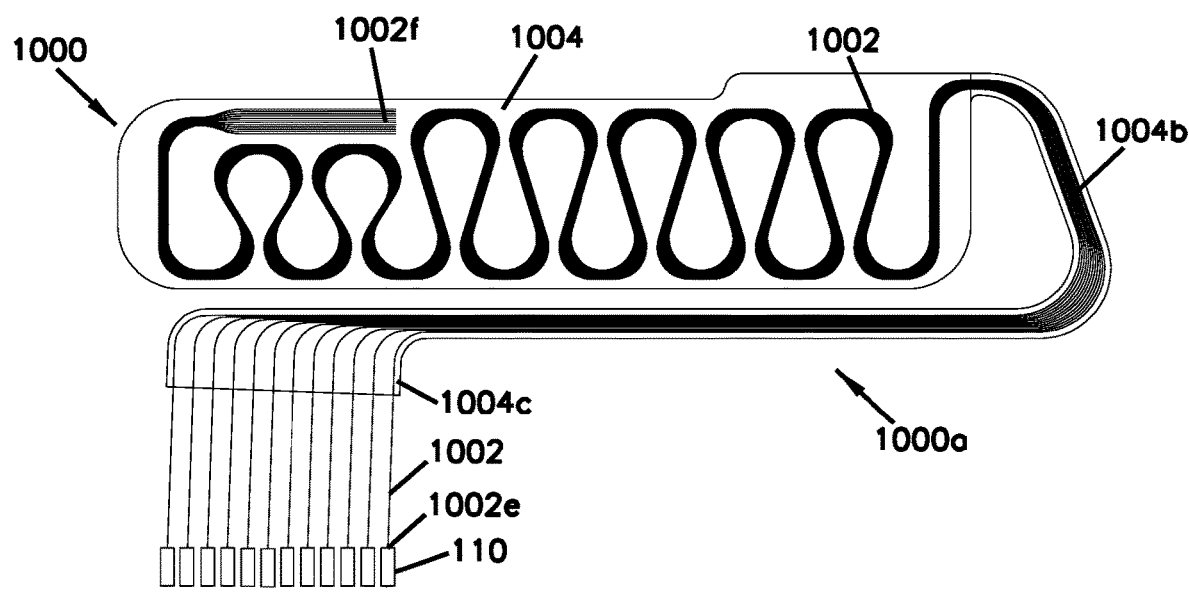
FIG. 1A is a top view of an example cable management arrangement in accordance with principles of the present disclosure.
Figure 6:
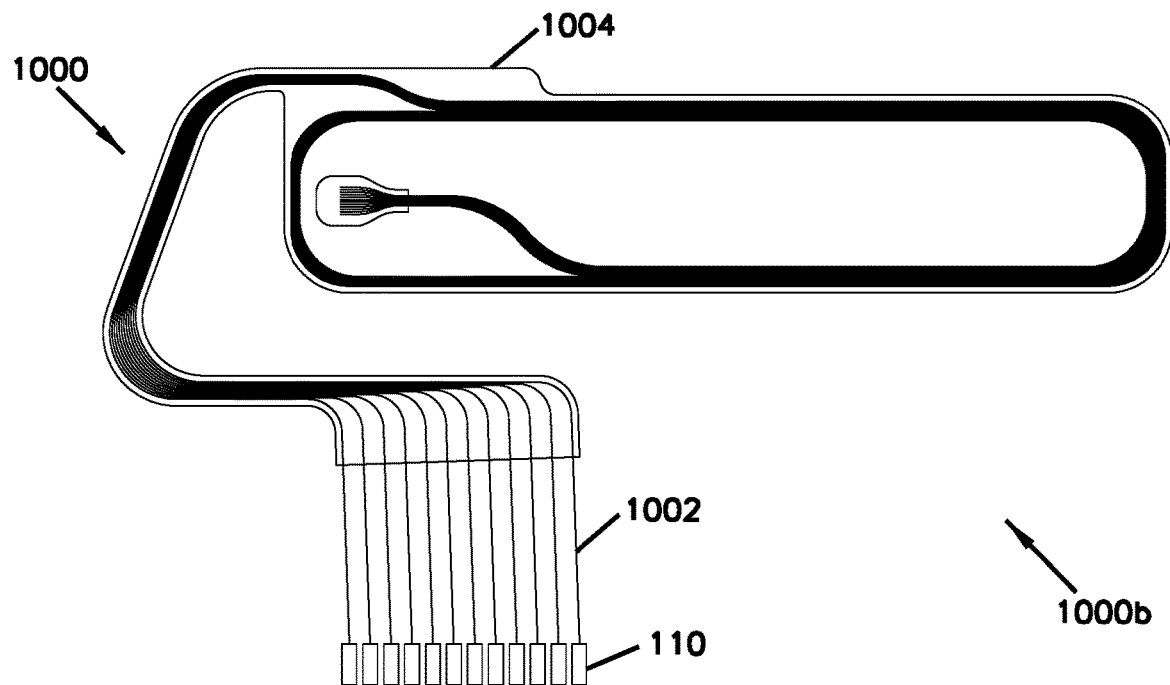
FIG. 6 is a top view of an example cable management arrangement in accordance with principles of the present disclosure.
Figure 7:
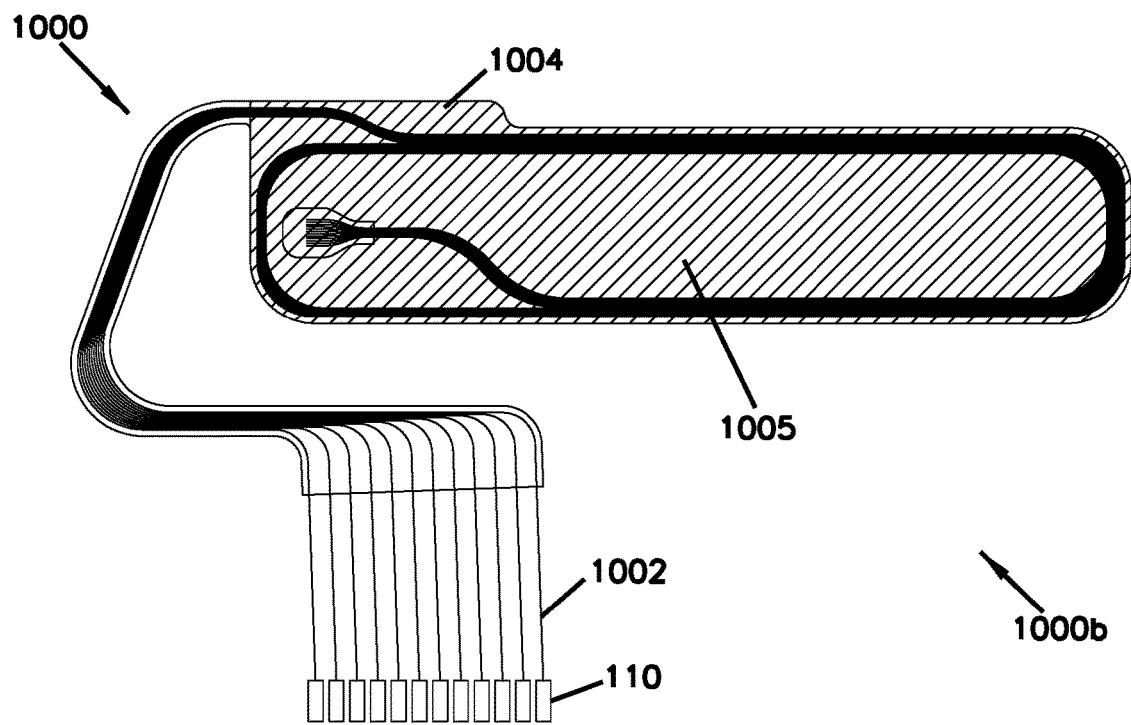
FIG. 7 is a top view of the cable management arrangement shown in FIG. 6 with a peel off area identified on the cable management arrangement.
Figure 8:
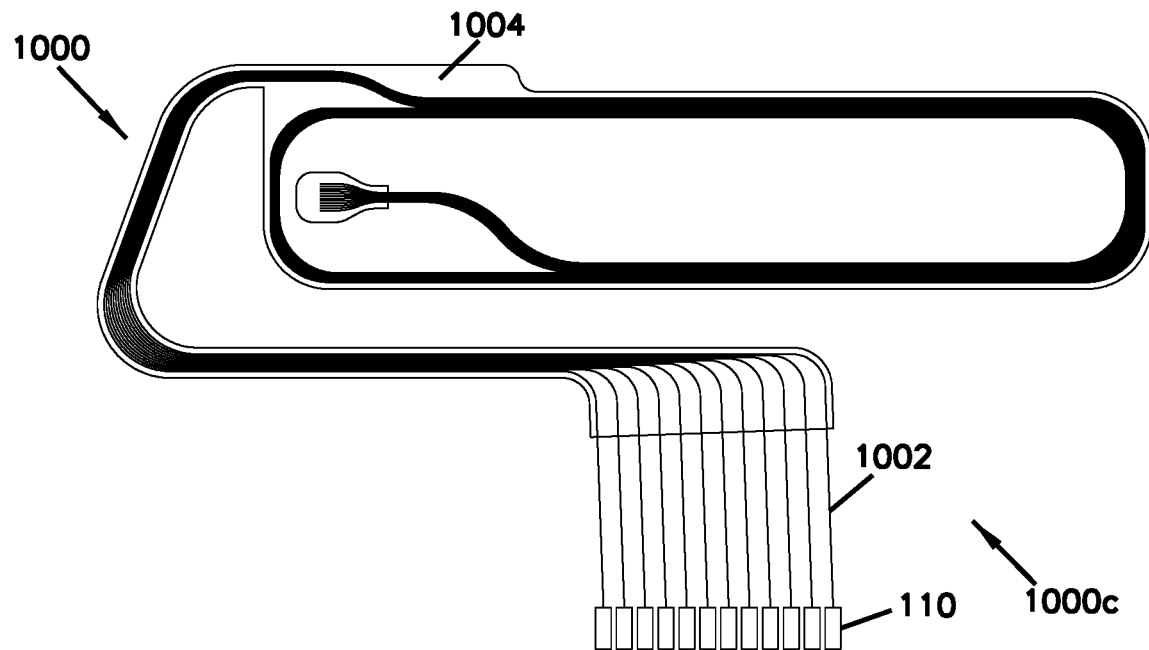
FIG. 8 is a top view of an example cable management arrangement in accordance with principles of the present disclosure.
Figure 9:
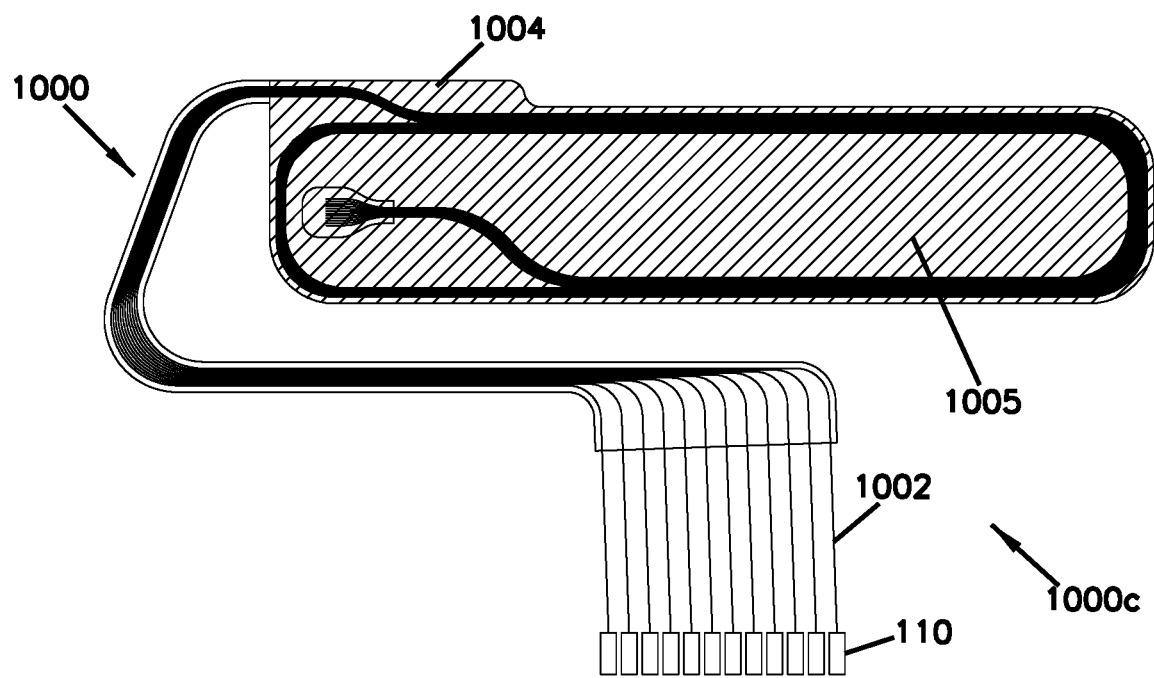
FIG. 9 is a top view of the cable management arrangement shown in FIG. 8 with a peel off area identified on the cable management arrangement.
Figure 10:
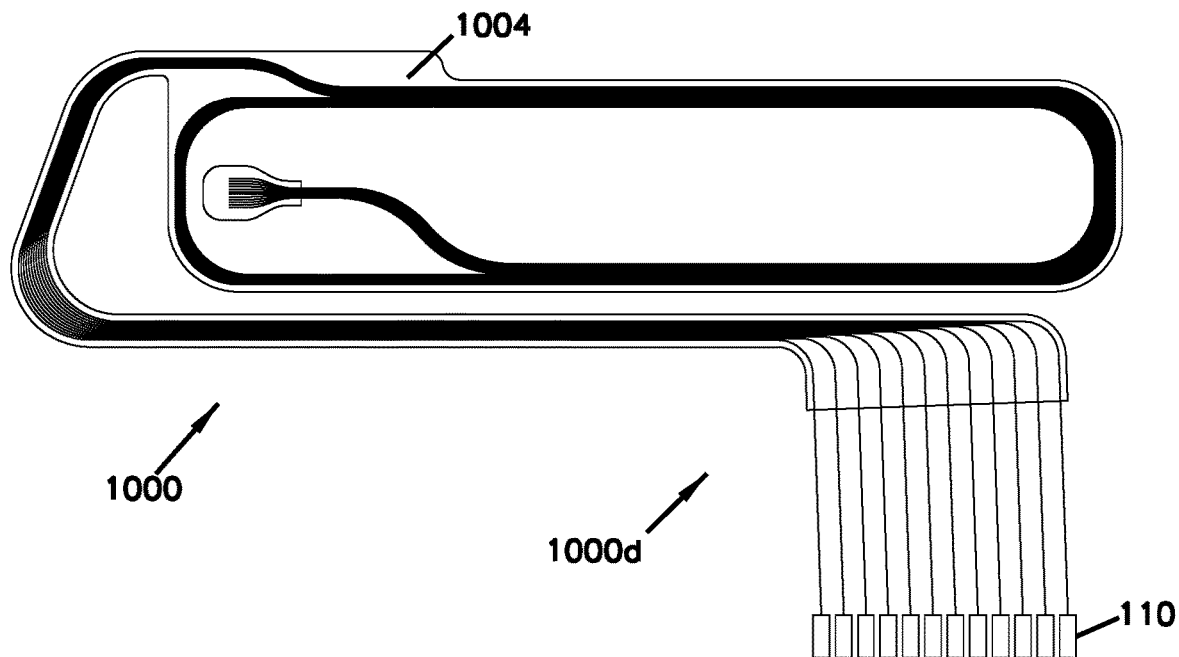
FIG. 10 is a top view of an example cable management arrangement in accordance with principles of the present disclosure.
Figure 11:
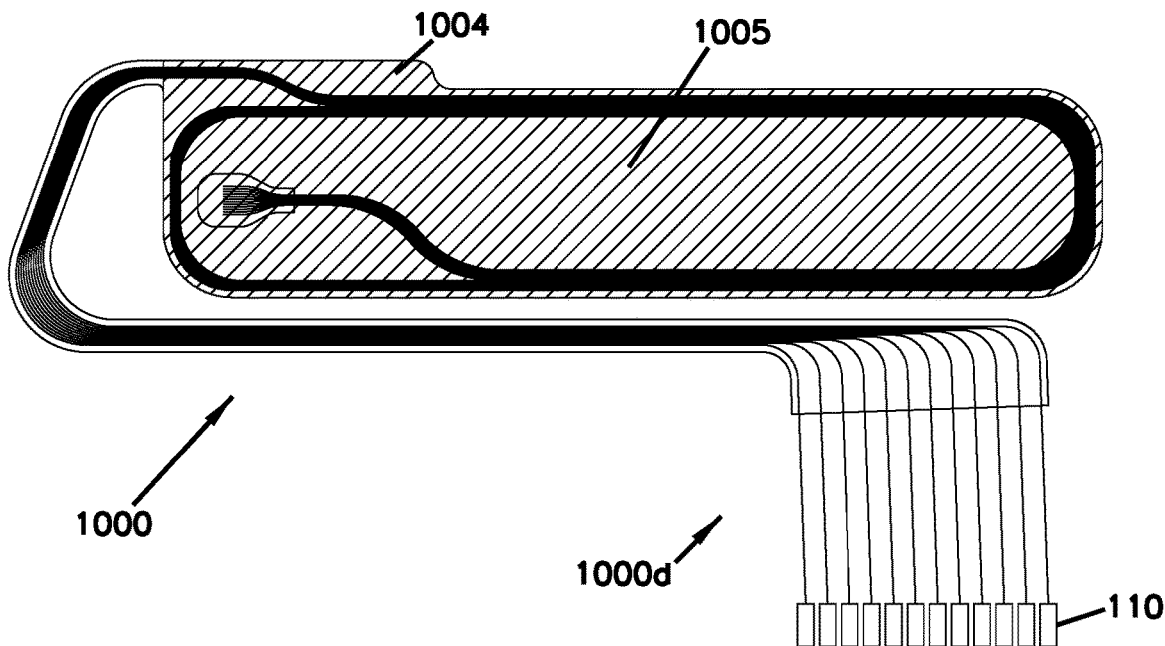
FIG. 11 is a top view of the cable management arrangement shown in FIG. 10 with a peel off area identified on the cable management arrangement.

The support sheet first side 1006 can be provided with a tacky surface such that when the cables 1002 are laid onto the sheet 1004, for example by a dispensing head, the cables 1002 remain sufficiently affixed to the sheet 1004 until the adhesive 1010 can be applied. By using an adhesive 1010 to affix the cables 1002 to the support sheet 1004, it can be completely assured that the cables 1002 are routed such that a minimum radius is always maintained when the cables 1002 must be routed along a curved pathway. Thus, the disclosed system ensures that the cables 1002 are routed and secured in a proper manner to protect the cables 1002 from damage. FIGS. 1 and 1A show example routing paths that could be utilized to maximize the stored length of cable while ensuring minimum bend radii are maintained.

FIG. 3A shows an alternate arrangement in which the adhesive 1010 is applied between the cables 1002 and the support sheet 1004. In such arrangements, the adhesive 1010 may be applied directly to the support sheet 1004 along a desired routing path for each individual cable 1002. Alternatively, or in addition, the adhesive 1006 may be applied across some or all of the first side 1006 of the support sheet 1004 without defining a desired cable routing pathway. In one example, the adhesive 1010 is applied to the first surface 1006, the cables 1002 are subsequently arranged on the support sheet first side 1006, and the adhesive 1010 cures such that the exposed portions of the adhesive 1010 not covered by cables 1002 no longer have an adhesive quality. In one example, the adhesive is applied to the cables 1002 which are then arranged onto the support sheet first side 1006. The adhesive 1010 can also be utilized to glue the cables 1002 to each other to form a ribbon from which the cables 1002 can be individually peeled either before or after the cables 1002 have been peeled from the support sheet first side 1006.

The second side 1008 of the support sheet 1004 may also be provided with an adhesive 1012. The adhesive 1012 may be any type of adhesive, for example a silicon-based adhesive. The adhesive 1012 may be provided over a portion or the entirety of the second side 1008 of the support sheet 1004. Where not provided over the entire surface, the adhesive 1012 may be provided in a random manner or in a pattern, such as a cross hatching-type pattern or a zig-zag pattern. To protect the adhesive 1012 until the sheet 1004 is ready to be applied to a mounting surface, a protective sheet 1014 may be provided to cover the adhesive 1012. To expose the adhesive 1012, the protective sheet 1014 can be peeled away from the adhesive 1012 and discarded. The protective sheet 1014 can be made from any of a variety of materials known in the art for protecting adhesives, for example coated paper-based materials. The support sheet 1004 can also be provided without an adhesive 1012 and may instead be configured to be mechanically attached to another surface. In some examples, the support sheet 1004 can be held by clips or can engage with slots provided on a structure, for example a tray. The support sheet 1004 may also be provided with apertures through which clips or other mechanical fasteners can extend. The support sheet 1004 can also be configured such that it is a stand-alone storage structure without features allowing the sheet to be secured to another structure.

In one example, the support sheet 1004 can be provided with a specified shape and size to define a desired routing path for the cables 1002. In the embodiment shown, the support sheet 1004 is shaped for installation within a fiber optic support tray 22, wherein the cables 1002 are arranged to extend between a splice tray 112 and the fiber optic adapters 108 of the support tray 22. The support tray 22 and related features are discussed in further detail below. Although an application involving a support tray 22 and splice tray 112 is described herein, the implementation of the cable management arrangement 1000 is in no way limited to such an application. Rather, the cable management arrangement 1000 can be used in any application where it is desired to have a pre-determined length of cable removably adhered to a support sheet that itself can be adhered to a support surface.

As shown, the support sheet 1004 can be characterized as including a first portion 1004a, a second portion 1004b, and a third portion 1004c that are disposed at non-zero angles to each other, thus requiring the cables to be bent or curved as they transition from one portion to another. The first portion 1004a is shaped to match the general shape of the splice tray 112, and is provided with adhesive 1012 on the second side 1008 to allow the first portion 1004a to be adhered to the bottom side of the splice tray 112. The protective sheet 1014 is also shaped to match the first portion 1004a.

Referring to FIGS. 2, 7, 9, and 11, the adhesive 1012 and protective sheet 1014 can be seen as being generally present at a peel off area 1005 where the cables 1002 can be peeled away from the support sheet 1004. At this area, the cables 1002 can be attached to the support sheet 1004 as previously described and as shown at FIGS. 3 and 3A. At areas where it is not desired that the cables 1002 can be peeled away from the support sheet 1004, such as at portions 1004b, 1004c, a second sheet 1016 may be added to cover the cables 1002, as shown at FIG. 3B. In such an arrangement, an adhesive 1010 can be utilized to secure the sheets 1004 and 1016 together against the cables 1002. At such locations, the adhesive 1012 and protection sheet 1014 can be provided, if desired. Alternatively, the adhesive and protection sheet can be excluded from the construction as is the case at least for the second portion 1004b. Once a cable 1002 is peeled from the sheet 1004 and reaches the location at which the second sheet 1016 is disposed (e.g. at the second portion 1004b), the cable 1002 is prevented from being further removed by the second sheet 1016. The second sheet 1016 also imparts additional stiffness to the resulting cable ribbon. The thickness and materials of the sheets 1004 and 1016 can be selected to achieve a desired stiffness and/or other properties.

The first portion 1004a can also be provided with an aperture 1004d at which the second end 1002f of the cables 1002 reside which allows the second ends 1002f to be free from adhesive. This configuration provides a manual location for starting the removal of the cable 1002 from the support sheet 1004 and also ensures that the adhesive 1012 does not interfere or otherwise damage the ends 1002f As can be seen, the second end 1002f is fanned out such that the cables 1002 have a slightly wider spacing between them. This construction allows for the selected cables 1002 to be individually peeled from the support sheet, if desired.

Figure 15:
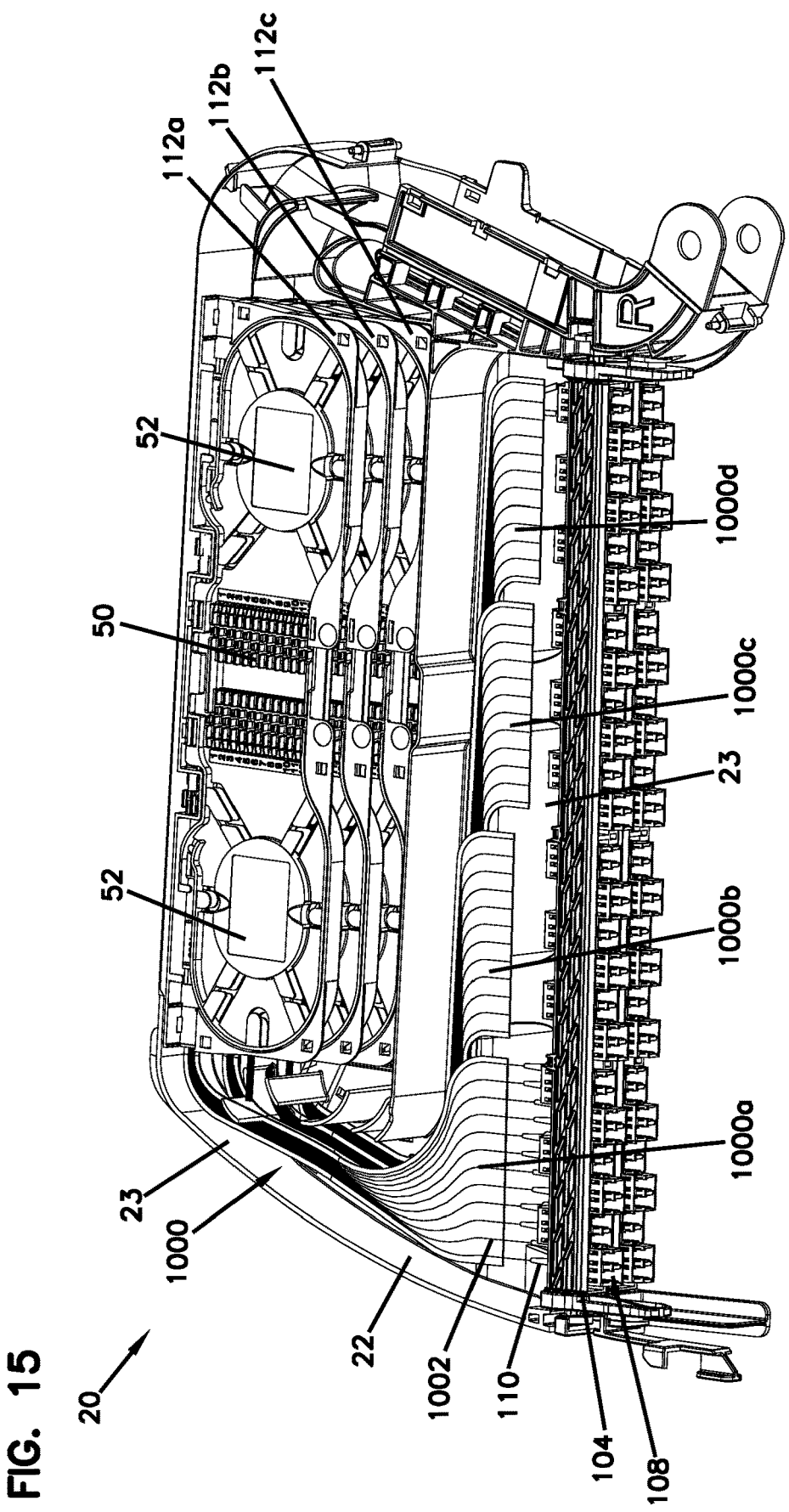
FIG. 15 is a front perspective view of an exemplary multi-positionable tray assembly usable with the telecommunications panel shown in FIG. 12 and including multiples of the cable management arrangements shown in FIGS. 1-2 and 6-10.
Figure 16:
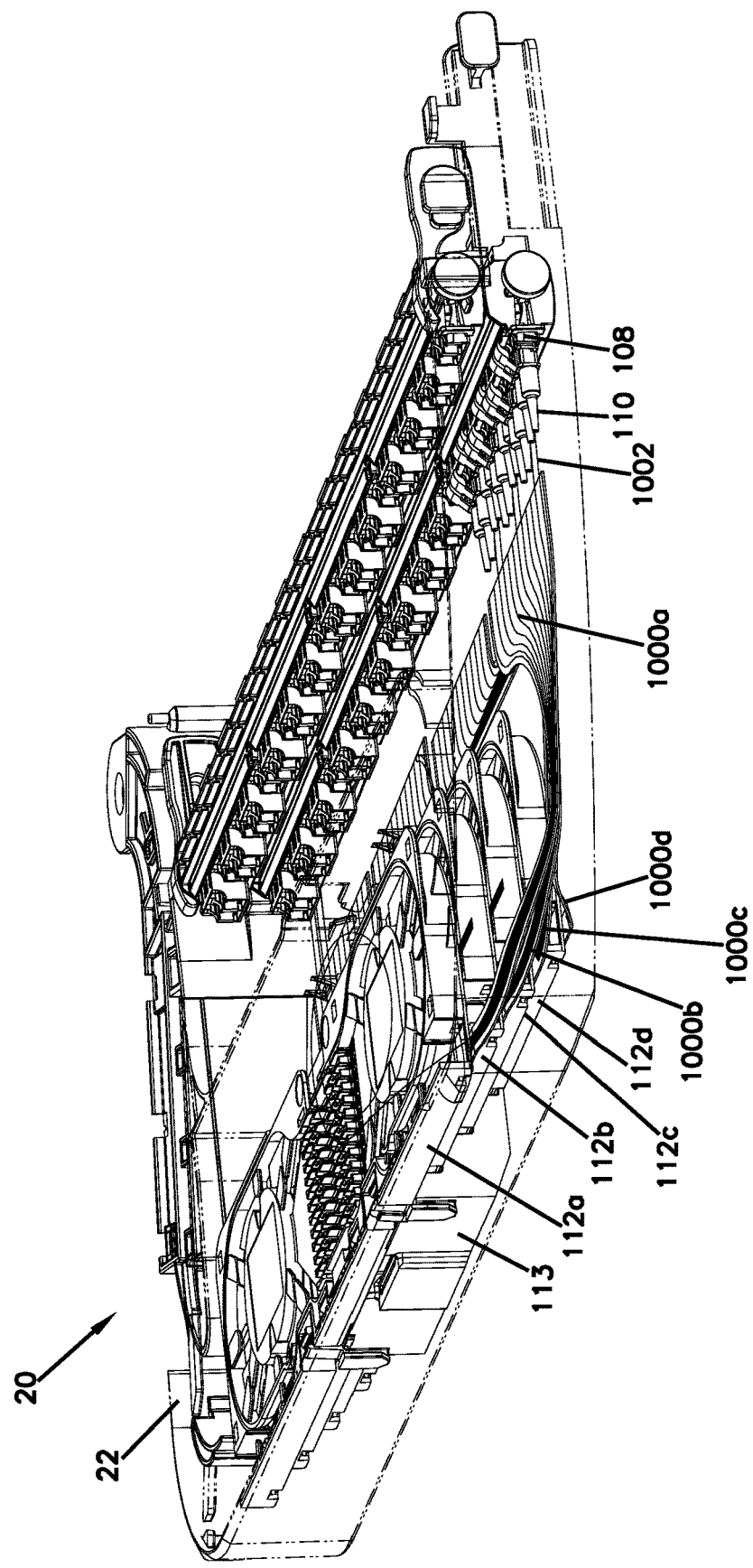
FIG. 16 is a rear perspective view of the tray assembly shown in FIG. 15 with portions of the tray not shown to further illustrate the interior components of the tray assembly.
Figure 17:
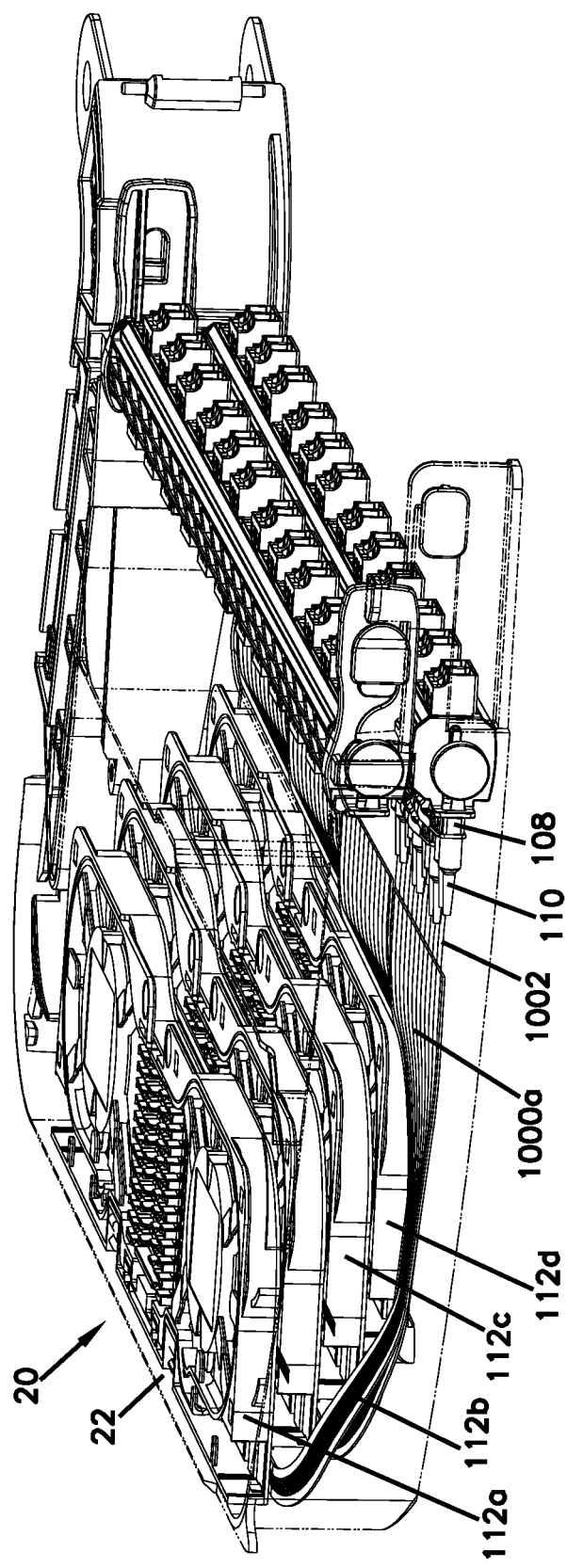
FIG. 17 is a side perspective view of the tray assembly shown in FIG. 15 with portions of the tray not shown to further illustrate the interior components of the tray assembly.

The cables 1002 disposed on the first portion 1004a of the support sheet 1004 are arranged adjacent to each other and are provided in a looped or coiled fashion such that a desired length of the cables 1002 can be stored on the first portion 1004a. As shown, the cables 1002 are looped or coiled twice proximate the perimeter edge of the first portion 1004a. The cables 1002 can be peeled from the first portion 1004*a* by their second ends 1004*b*, which allows the cables 1002 to be routed over to the splice holders 50 on the top side of the splice tray 112 (see FIG. 15). The remaining loose portion of the cables 1002 can be held at storage locations 52 on the splice tray 112. In one example, the stored length of each cable 1002 on the first portion 1004*a* is about 2 meters, wherein any length up to that amount can be peeled away from the sheet 1004. In many applications, at least one meter will be removed from the sheet 1004 to allow for enough length to perform a splicing or other action. As stated previously, the cables 1002 can be adhered to each other 1002 such that all of the cables can be removed from the support sheet 1004 individually or together as a ribbon and subsequently peeled from the ribbon if removed together.

The second portion 1004*b* of the support sheet 1004 provides for a routing pathway for the cables 1002 which brings the cables 1002 from the splice tray 112 towards the adapters 108 to which the cables 1002 will connect. Accordingly, the cables 1002 are disposed in relatively close proximity to each other on the second portion 1004*b* and the second portion 1004*b* is relatively narrow. The third portion 1004*c* provides a fan out region such that the cables 1002 can be separated from each other sufficiently to allow for the connectors 110 to be installed and to allow for alignment between the connectors 110 and the adapters 108 to which they are configured to connect. Although the support sheet 1004 is shown as having specifically shaped first, second, and third portions 1004*a*, 1004*b*, 1004*c*, the support sheet 1004 can be given any shape to suit a particular application.

FIGS. 6-11 show three additional arrangements of the cable management arrangement 1000 in which the second portion 1004*b* of the support sheet 1004 is provided at different lengths to route the cables 1002 to different locations within the support tray 22. For ease of reference, the arrangement of FIGS. 1 and 2 can be referred to as cable management arrangement 1000*a*, the arrangement of FIGS. 6 and 7 can be referred to as cable management arrangement 1000*b*, the arrangement of FIGS. 8 and 9 can be referred to as cable management arrangement 1000*c*, and the arrangement of FIGS. 10 and 11 can be referred to as cable management arrangement 1000*d*. As stated previously, many other arrangements are possible.

Telecommunications Panel—General

Figure 12:
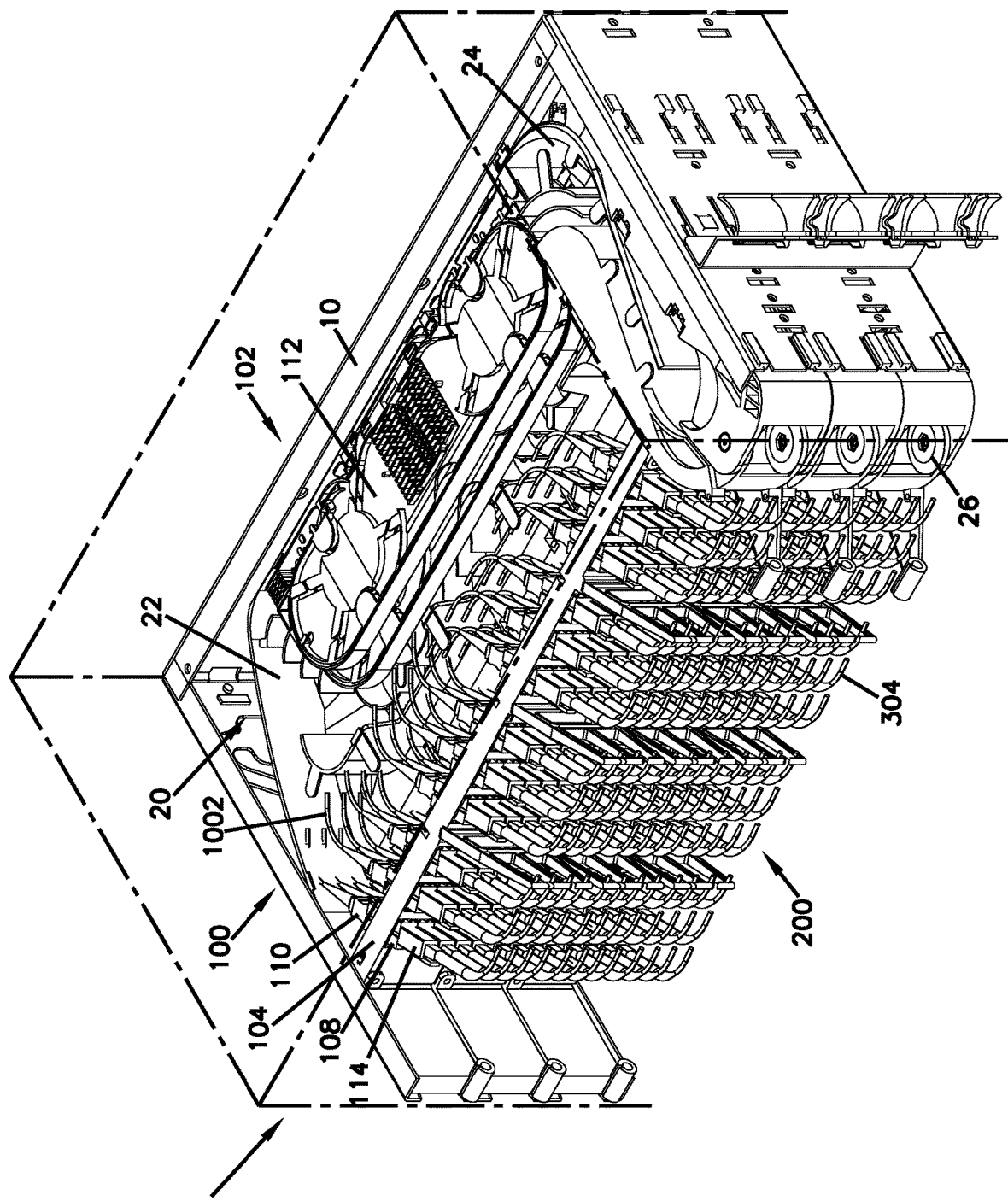
FIG. 12 is a perspective view of an example telecommunications panel including a plurality of multi-positionable tray assemblies in accordance with principles of the present disclosure.

Referring to FIG. 12, a telecommunications panel 100 (e.g., an enclosure, an optical distribution frame, etc.) is illustrated according to the principles of the present disclosure, within which the disclosed cable management arrangement 1000 may be utilized. As further illustrated at FIG. 1, the telecommunications panel 100 may be included in a cabinet 200 of a telecommunications system 1. The telecommunications panel 100 and/or the cabinet 200 may be used for various purposes in telecommunications systems and may include a chassis 10 to which a plurality of stacked multi-positionable tray assemblies 20 may be removably attached. In one aspect, the multi-positionable tray assembly 20 includes a support tray 22 (e.g., a sub-rack) and a support arm 24 that are pivotally connected to each other via a pivot joint 26 that allows the tray assembly 20 to be moved between a folded position and an access position.

Figure 13:
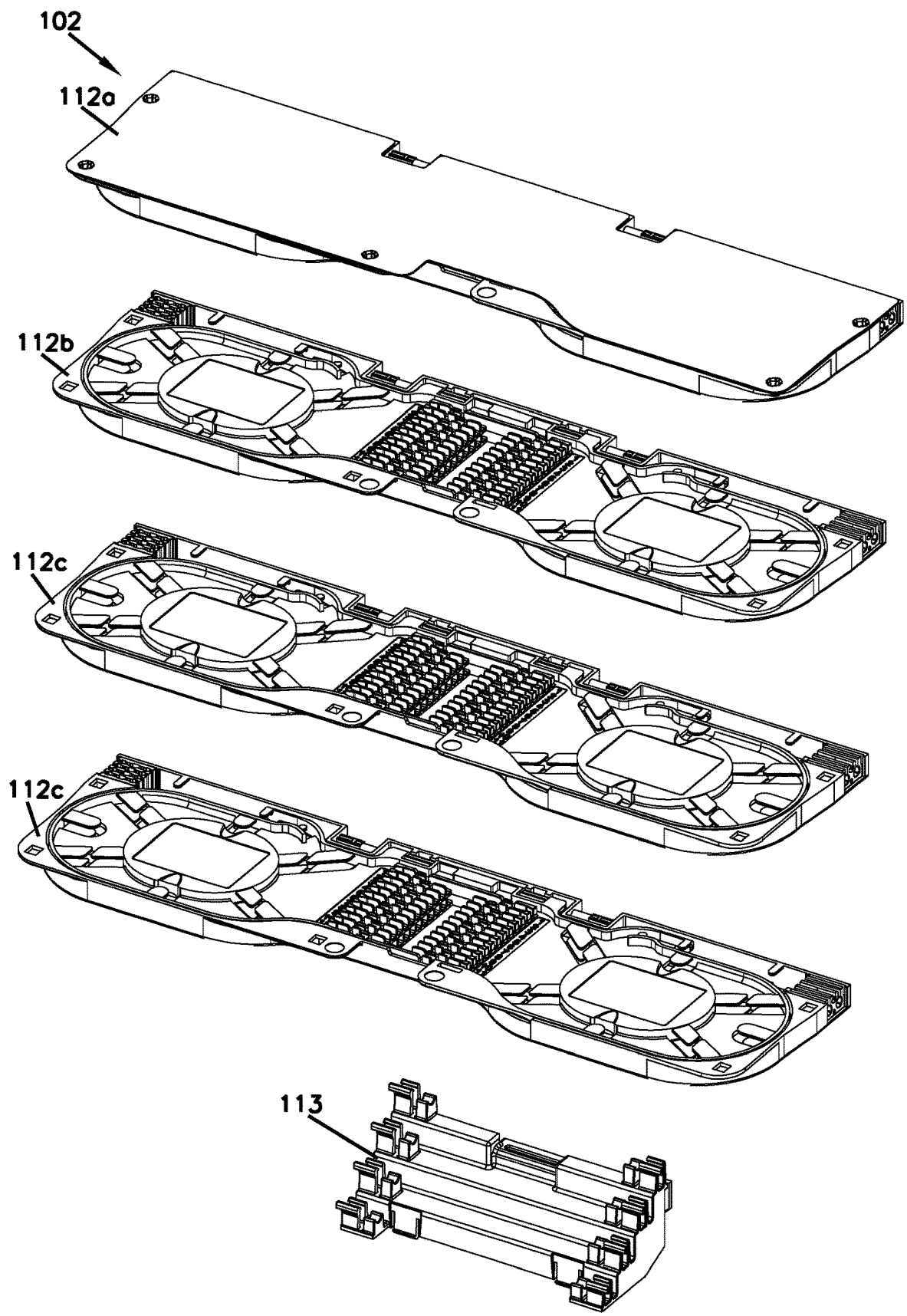
FIG. 13 is an exploded view of a cable management structure usable within the tray assembly shown in FIG. 12.
Figure 14:
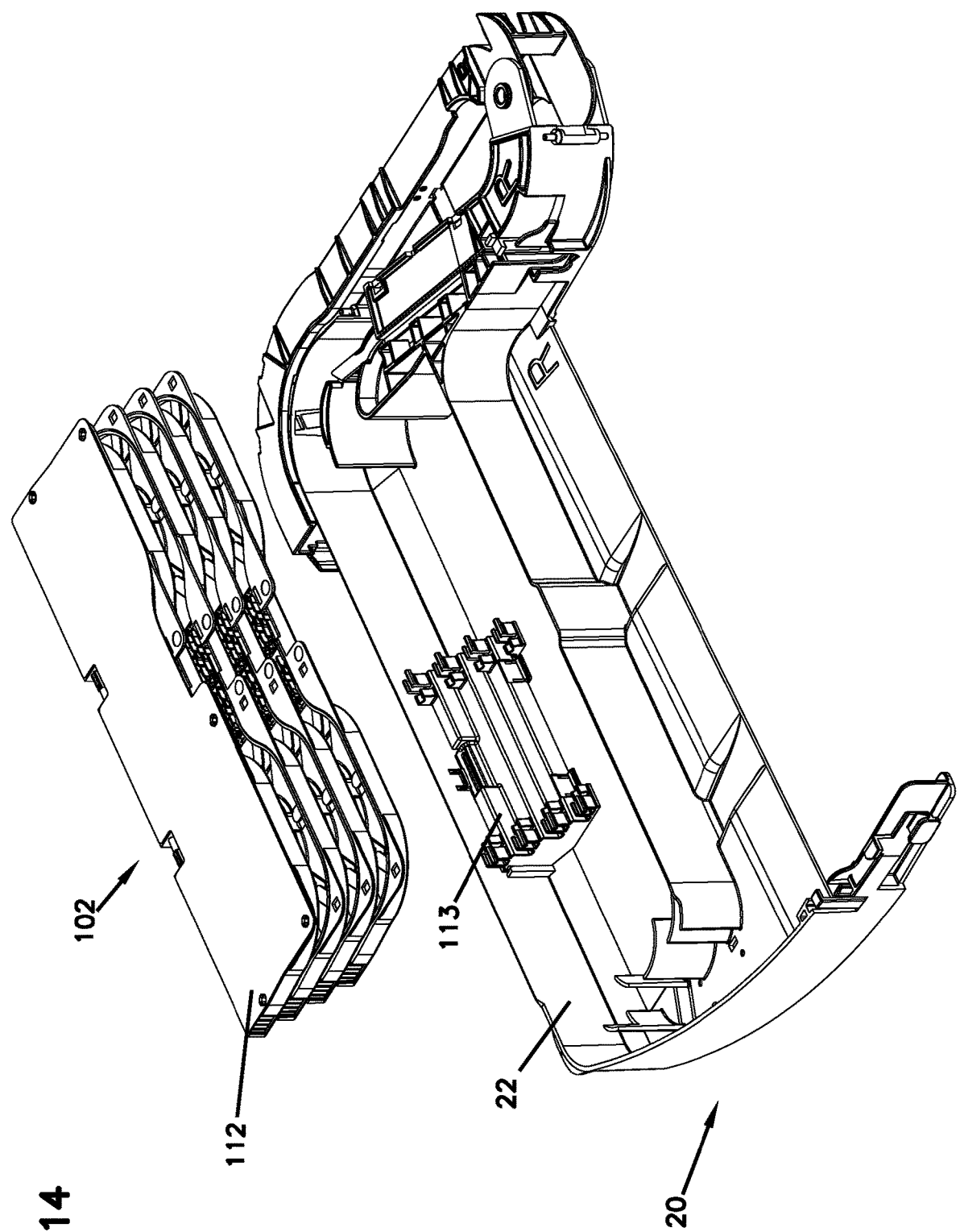
FIG. 14 is a view of the cable management structure shown in FIG. 13 aligned with a tray of the multi-positionable tray assembly shown in FIG. 12.

In the example shown, the support tray 22 houses a cable management structure 102 including, for example, stacked splice trays 112 and a patch panel 104. Referring to FIGS. 13 and 14, one example of a snap-fit cable management structure 102 is shown which includes a plurality of splice trays 112 (112*a*, 112*b*, 112*c*, 112*d*) that are snap-fit and pivotally mounted to a base structure 113 which is in turn snap-fit into a tray 22. Other arrangements are possible, for example, trays 112 may be splitter trays.

In one aspect, patch cords 1002 (shown schematically) of the cable management arrangement 1000 and patch cords 304 (i.e., patch cables, connectorized fiber optic cables, etc.) may enter the telecommunications panel 100 and/or the cabinet 200 and be interconnected at the patch panel 104. The patch panel 104 may include a plurality of fiber optic adapters 108. Fiber optic connectors 110, 114 that terminate ends of the patch cords 1002, 304 may connect with the fiber optic adapters 108 of the patch panel 104. The interconnections at the patch panel 104 may be rearranged from time-to-time, as desired, for changing configurations of the telecommunications system. The telecommunications panel 100 may further hold splitters, filters, and various other telecommunications components. An exemplary telecommunications system 1 is shown and described in U.S. Provisional Patent Application 62/051,093, filed on Sep. 16, 2014 and in Patent Cooperation Treaty Application PCT/EP2015/071196, filed on Sep. 16, 2015, the entireties of each being incorporated by reference herein.

Example Tray 22

Referring to FIGS. 15-20, an example telecommunications tray assembly 20 is presented which utilizes each of the cable management arrangements 1000*a*, 1000*b*, 1000*c*, 1000*d* for a corresponding splice tray 112*a*, 112*b*, 112*c*, 112*d* in a tray 22 of a tray assembly 20. For the purpose of clarity, only the cable management arrangement 1000*a* is shown with cables 1002 extending beyond the support sheet 1004 with attached connectors 110. In an actual installation, each of the cable management arrangements 1000*a*-1000*d* could be connectorized, although it is entirely possible to provide the arrangements without connectors, as shown.

Figure 18:
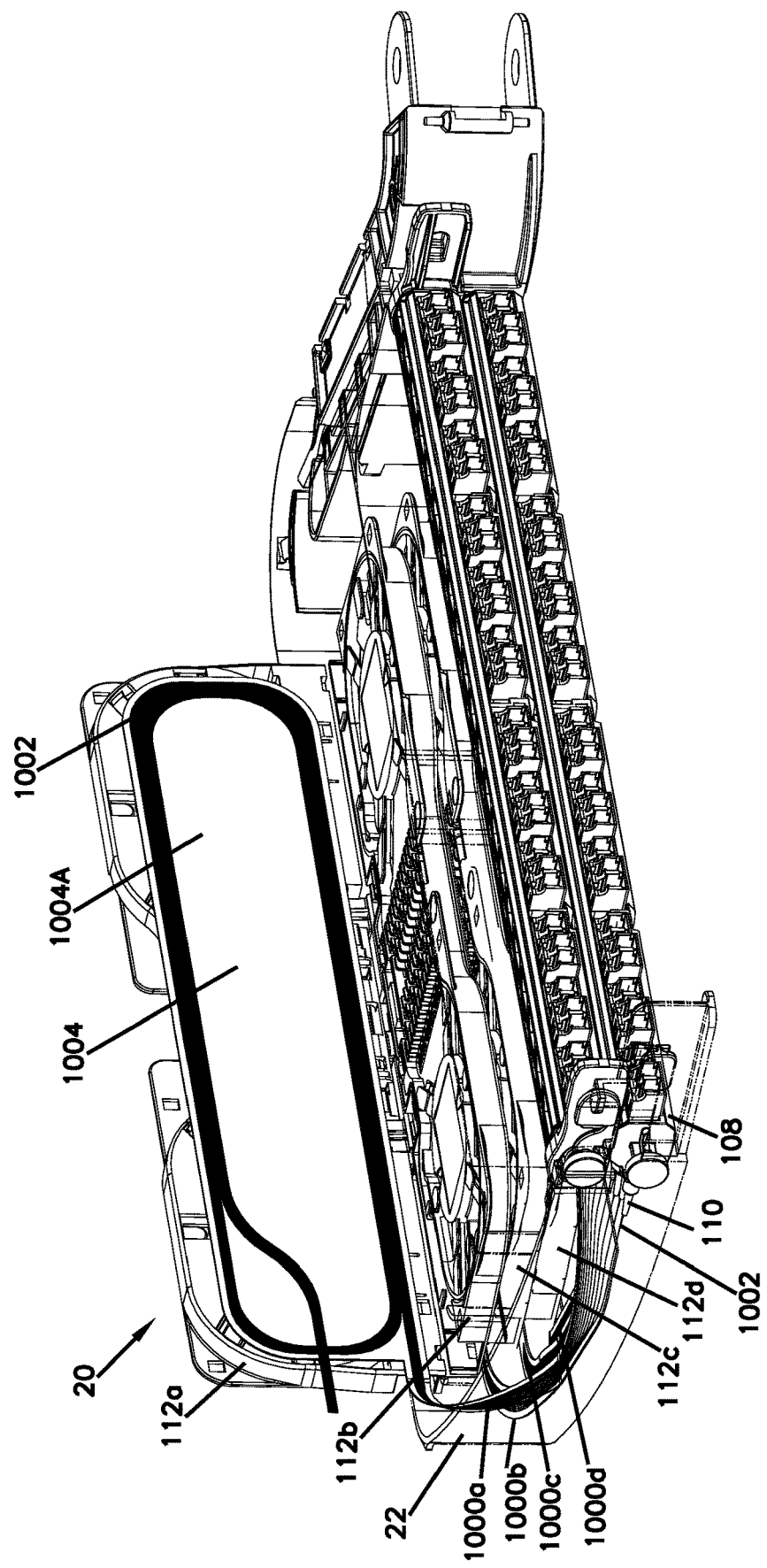
FIG. 18 is a front left perspective view of the tray assembly shown in FIG. 15 with a splice tray of the tray assembly shown in a raised position.
Figure 19:
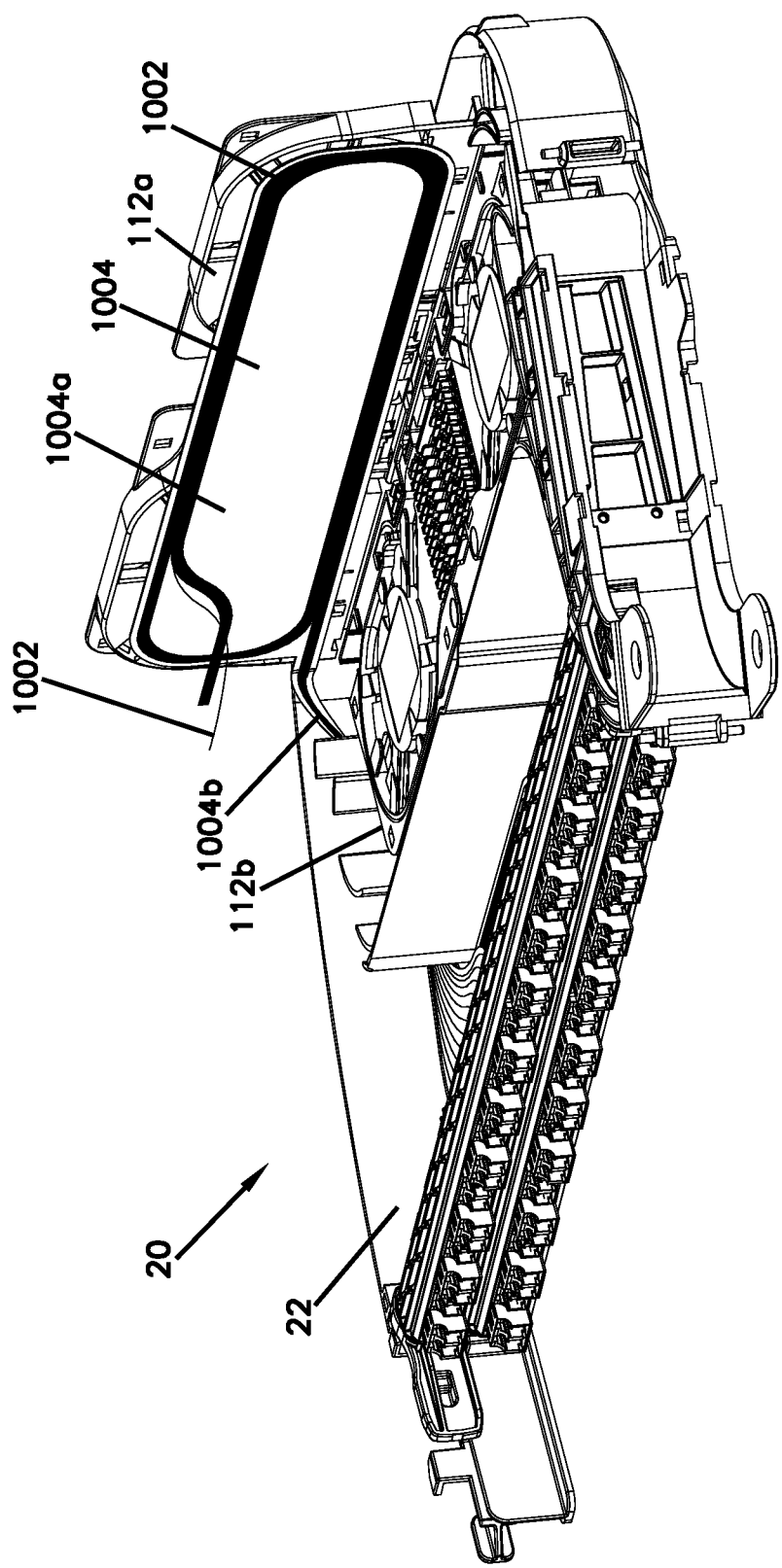
FIG. 19 is a front right perspective view of the tray assembly shown in FIG. 15 with a splice tray of the tray assembly shown in a raised position.

As most easily seen at FIGS. 18 and 19, it can be seen that the support sheet first portion 1004*a* of the cable management arrangement 1000*a* is adhered to the bottom surface of the splice tray 112*a* via the adhesive 1012. Although an adhesive connection is shown, attachment may be via a fastener system (e.g. clamping, bolting, clips, screws, slots that receive the support sheet edges, etc.). The cable management arrangements 1000*b*, 1000*c*, and 1000*d* are similarly attached to the respective splice trays 112*b*, 112*c*, and 112*d*. This arrangement, in which each individual cable 1002 is adjacent to other cables 1002 (i.e. not bundled over other cables) provides for a very flat configuration which can easily fit between the trays 112*a*-112*d* without causing additional bulk or requiring additional clearances.

Each of the support sheet second portions 1004*b* extends into and along a side channel 23 defined within the tray 22 in a direction towards the adapters 108. The second portions 1004*b* at this location serve as a bending or hinge point for the cables 1002 when the respective tray 112 is opened and closed. The support sheet 1004 is provided with enough flexibility to enable this function, but with enough stiffness to prevent undue bending or kinking of the cables 10002. The support sheet second portions 1004*b* further extend laterally over from the side channel 23 into a front area 25 defined between the trays 112 and adapters 108. As can be readily seen at FIGS. 16-18, the cable support sheet second portions 1004*b* are disposed over each other in a flat arrangement.

The support sheet second and third portions 1004*b*, 1004*c* are together arranged to allow the connectors 110 associated with the cable management arrangement 1000 to be aligned with the adapters 108 to which they can be attached. This configuration ensures that sufficient alignment is achieved such that the cables 1002 do not have to bend sharply to accommodate the connectors 110 attaching to the adapters 108. Additionally, and as mentioned previously, the routing of the cables 1002 on the support sheet 1004 is controlled to prevent the cables 1002 from being exposed to sharp bends or kinking that may damage the cables 1002. The third portion 1004c in particular minimizes required bending of the cables 1002 by spreading out the cables 1002 such that each individual cable 1002 aligns with an individual adapter 108, to the extent possible.

The disclosed approach of utilizing the cable management arrangements 1000a-1000d allows for the cables 1002 from one tray 112a-112d to be routed to the adapters 108 without the potential entanglement from cables 1002 associated with the other trays. Additionally, the disclosed arrangement results in a flattened cable arrangement and therefore requires less space within the tray 22 for cable routing. Yet another advantage of this arrangement is that the cables 1002 associated with a particular tray 112a-122d can be easily removed from the tray 22 without interference from the cables 1002 associated with the other trays 112a-112d. These are significant improvements over prior art arrangements in which individual cables extend from the trays 112a-112d to the adapters 108 in a general bundle where the likelihood of entanglement is increased and separation and identification of particular cables can be time consuming and cumbersome.

Figure 20:
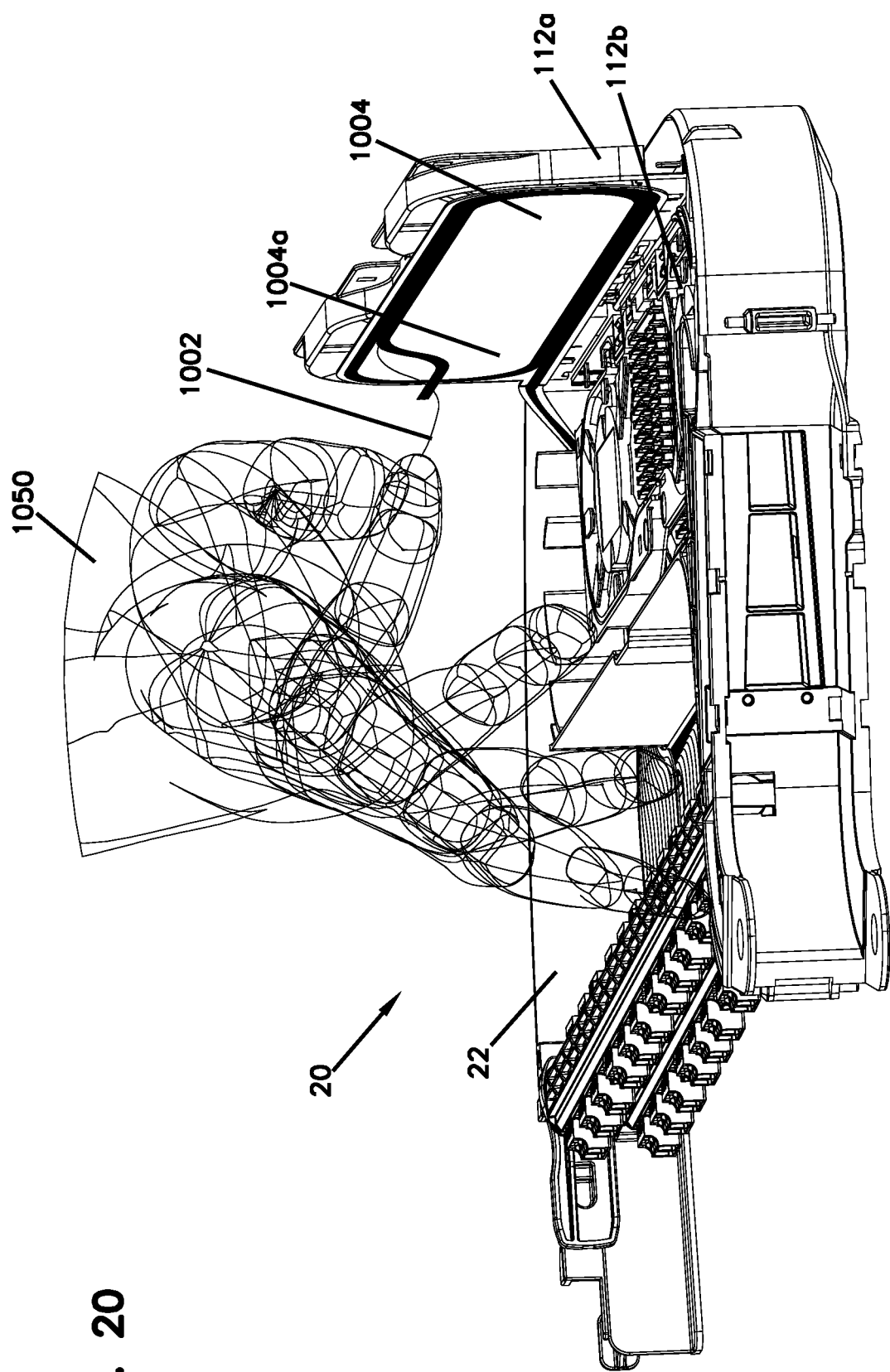
FIG. 20 is a front right perspective view of the tray assembly shown in FIG. 15 with a splice tray of the tray assembly shown in a raised position and showing an operator removing a single cable from the cable management arrangement.

Still referring to FIGS. 19 and 20, it can be seen that a user 1050 can selectively remove an individual cable 1002 from the stored cables 1002 below the tray 112 and peel as much of the cable from the tray 112 as desired. This partially removed cable 1002 can then be routed to the top side of the tray 112 where it can be spliced with another cable or telecommunications component and mounted to the tray 112. This feature not only allows for the previously mentioned storage benefits, but also allows for cables 1002 to reside beneath the trays 112 until they are actually needed so that additional connections can be made when needed without requiring the installation of additional cable. In one example, a tray 112, or other telecommunications component, can be provided with a factory mounted cable management arrangement 1000. The cables 1002 of such a configuration could also be connectorized with connectors 110, which would allow an installer to simply identify a tray and cable management arrangement 1000 combination that suits a particular purpose and then install the combination as a single unit. This approach can result in significant installation cost savings whether it occurs within the factory or in the field.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

LIST OF REFERENCE NUMERALS AND CORRESPONDING FEATURES

1 telecommunications system
10 chassis
20 multi-positionable tray assembly
22 support tray
50 holding area
52 storage area
100 telecommunications panel
102 cable management structure
104 patch panel
108 fiber optic adapters
110 first fiber optic connectors
112 splice tray
112a splice tray
112b splice tray
112c splice tray
112d splice tray
200 cabinet
304 patch cord
1000 cable management arrangement
1000a cable management arrangement
1000b cable management arrangement
1000c cable management arrangement
1000d cable management arrangement
1002 cables
1002a jacket
1002b a strengthening layer
1002c an aramid cladding layer
1002d a buffer tube
1002e first end
1002f second end
1003 optical fiber
1003a core
1003b cladding layer
1003c coating/acrylate later
1003d jacket
1004 support sheet
1004a first portion
1004b second portion
1004c third portion
1006 first side
1008 second side
1010 first adhesive
1012 second adhesive
1014 protective sheet
1016 second sheet

What is claimed is:

1. A cable management arrangement comprising:
   (a) a plurality of cables extending between first and second ends; and
   (b) a supporting sheet having a first side and a second side, a first length of at least some of the plurality of cables being permanently adhered to the supporting sheet first side such that the first length of the plurality of cables is prevented from being peeled from the supporting sheet, and a second length of the at least some of the plurality of cables being removably adhered to the supporting sheet first side by a first adhesive such that the second length of the plurality of cables can be peeled from the supporting sheet.

2. The cable management arrangement of claim 1, wherein the plurality of cables are fiber optic cables.

3. The cable management arrangement of claim 2, further comprising a plurality of optical connectors provided on the first ends of the plurality of cables.

4. The cable management arrangement of claim 1, wherein the first adhesive is a silicone-based adhesive.

5. The cable management arrangement of claim 1, wherein the plurality of cables includes at least one power cable and at least one telecommunications cable.

6. The cable management arrangement of claim 5, wherein the plurality of cables are non-overlapping and are arranged in a side-by-side arrangement.

7. The cable management arrangement of claim 6, wherein the plurality of cables are adhesively bonded to each other.

8. The cable management arrangement of claim 1, wherein the first length of the at least some of the plurality of cables is disposed between the supporting sheet and a second sheet such that the first length is prevented from peeling from the supporting sheet.

9. A cable management arrangement comprising:
   (a) a plurality of optical fibers extending between first and second ends, the first ends being provided with optical connectors;
   (b) a supporting sheet having a first side and a second side, at least a portion of the plurality of optical fibers being permanently adhered to the supporting sheet first side, and at least a portion of the plurality of optical fibers being removably adhered to the supporting sheet on the first side;
   (c) an adhesive provided on at least a portion of the supporting sheet second side; and
   (d) a protection sheet covering the adhesive, the protection sheet being removable from the supporting sheet to allow the supporting sheet to be adhered to a surface.

10. The cable management arrangement of claim 9, wherein the first adhesive is a silicone based adhesive.

11. The cable management arrangement of claim 9, wherein the plurality of optical fibers are non-overlapping and are arranged in a side-by-side arrangement.

12. The cable management arrangement of claim 11, wherein the plurality of optical fibers are adhesively bonded to each other.

13. The cable management arrangement of claim 9, wherein the optical connectors are LC type connectors.

14. The cable management arrangement of claim 9, wherein the supporting sheet has a first portion and a second portion disposed at a non-zero angle to the first portion.

15. The cable management arrangement of claim 14, wherein the adhesive is provided only at the first portion.

16. The cable management arrangement of claim 9, wherein the at least a portion of the plurality of optical fibers that are permanently adhered are disposed between the supporting sheet and a second sheet.

17. A method of installing telecommunications cable in a telecommunications assembly, the method comprising:
   (a) providing a telecommunications tray having one or more cables adhered to a flexible supporting sheet construction, each of the one or more cables having a first segment and a second segment, wherein the first segment of at least some of the one or more cables is permanently secured to the supporting sheet construction by a second sheet, and wherein the second segment of at least some of the one or more cables is removably adhered to the supporting sheet construction on a first side;
   (b) peeling only a portion of a total adhered length of the one or more cables from the flexible supporting sheet construction; and
   (c) connecting at least one of the one or more cables to a telecommunications component or to a second cable via splicing.

18. The method of claim 17, wherein the one or more cables is in the shape of a coil when the one or more cables is stored on the flexible supporting sheet construction.

* * * * *